(12) United States Patent
Örtegren et al.

(10) Patent No.: US 6,585,086 B2
(45) Date of Patent: Jul. 1, 2003

(54) MODULAR BRAKE MECHANISM

(75) Inventors: Anders Örtegren, Landskrona (SE); Stefan Sandberg, Lomma (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 09/865,951

(22) Filed: May 25, 2001

(65) Prior Publication Data

US 2002/0017437 A1 Feb. 14, 2002

(30) Foreign Application Priority Data

May 31, 2000 (SE) .............................................. 0002058
Aug. 18, 2000 (SE) .............................................. 0002942

(51) Int. Cl.$^7$ .............................................. F16D 55/00
(52) U.S. Cl. .................. 188/73.32; 188/71.1; 188/71.8; 188/72.9
(58) Field of Search .............................. 188/73.32, 71.1, 188/71.3, 71.7, 71.8, 72.1, 72.9, 73.33, 73.34, 196 V, 196 D

(56) References Cited

U.S. PATENT DOCUMENTS

| | | | |
|---|---|---|---|
| 3,517,777 A | 6/1970 | Beller | 188/73.1 |
| 3,724,616 A | 4/1973 | Burnett | 188/345 |
| 3,734,243 A | 5/1973 | Girauldon | 188/72.4 |
| 3,741,350 A | 6/1973 | Knapp | 188/72.6 |
| 3,830,343 A | 8/1974 | Gardner | 188/71.8 |
| 3,837,437 A | 9/1974 | Martins | 188/71.8 |

(List continued on next page.)

FOREIGN PATENT DOCUMENTS

| | | |
|---|---|---|
| DE | 26 03 109 | 1/1976 |
| DE | 26 14321 C2 | 4/1976 |
| DE | 261 4321 | 10/1976 |
| DE | 26 49 666 | 10/1978 |
| DE | 32 13 356 A1 | 4/1982 |
| DE | 33 48 359 C2 | 10/1983 |
| DE | 34 23 875 A1 | 6/1984 |
| DE | 37 16 202 A1 | 5/1987 |
| DE | 37 16 202 C2 | 5/1987 |
| DE | 3610569 | 10/1987 |
| DE | 40 32 885 A1 | 10/1990 |
| DE | 40 32 886 A1 | 10/1990 |
| DE | 3348359 | 5/1991 |
| DE | 41 31 631 A1 | 9/1991 |
| DE | 43 07 019 A1 | 3/1993 |
| DE | 195 15 063 | 4/1995 |
| DE | 196 42 384 | 10/1996 |
| EP | 0 108 680 | 5/1984 |
| EP | 0182336 | 7/1987 |
| EP | 0145535 | 11/1987 |
| EP | 0271864 | 5/1989 |
| EP | 0436909 | 7/1991 |
| EP | 0 495 311 A1 | 12/1991 |
| EP | 0478917 | 6/1992 |
| FR | 2306372 | 8/1978 |
| GB | 2 090 355 | 12/1981 |
| GB | 2 102 088 | 6/1982 |
| SU | 1657070 | 12/1986 |
| WO | WO96/12900 | 5/1996 |

OTHER PUBLICATIONS

A Comparative Overview of Air Disc Brake Designs Nov. 9, 1981.
Proceedings of the Institute of Mechanical Engineers International Conference for Commercial Vehicles Design and Developement of Disc Brakes (date unknown).
Bendix Heavy Vehicle Systems Group brochure listing features of the Bendix Air Disc Brake (date unknown).

*Primary Examiner*—Pam Rodriguez
(74) *Attorney, Agent, or Firm*—St. Onge Steward Johnston & Reens LLC

(57) ABSTRACT

The present invention concerns a brake mechanism for a brake disc. The brake mechanism comprises a brake lever, a cross bar, one or more thrust plates and a closing plate. The brake mechanism is of a modular form comprising two or more units.

7 Claims, 8 Drawing Sheets

U.S. PATENT DOCUMENTS

| | | | |
|---|---|---|---|
| 3,937,304 A | 2/1976 | Brix | 188/73.5 |
| 3,967,705 A | 7/1976 | Johannesen | 188/71.9 |
| 4,018,310 A | 4/1977 | Ritsema | 188/73.3 |
| 4,071,118 A | 1/1978 | Johannesen | 188/71.9 |
| 4,109,765 A | 8/1978 | Johannesen | 188/72.7 |
| 4,184,571 A | 1/1980 | Karasudami | 188/72.7 |
| 4,222,310 A | 9/1980 | Garrett | 92/128 |
| 4,378,863 A | 4/1983 | Baum | 188/71.8 |
| 4,465,164 A * | 8/1984 | Anderson | 188/73.44 |
| 4,522,286 A | 6/1985 | Villata | 188/72.7 |
| 4,681,194 A | 7/1987 | Tsuruta | 188/71.9 |
| 4,693,341 A | 9/1987 | Drott | 188/72.7 |
| 4,705,147 A | 11/1987 | Pressaco | 188/196 |
| 4,809,822 A | 3/1989 | Margetts | 188/72.7 |
| 5,172,792 A * | 12/1992 | Cartwright et al. | 188/71.1 |
| 5,433,298 A | 7/1995 | Antony | 188/72.7 |
| 5,547,048 A | 8/1996 | Antony | 188/72.9 |
| 5,590,742 A | 1/1997 | Gutelius | 188/70 R |
| 5,833,035 A | 11/1998 | Severinsson | 188/72.7 |
| 5,927,445 A | 7/1999 | Bieker et al. | 188/72.9 |
| 5,960,914 A | 10/1999 | Isai | 188/72.8 |
| 6,105,734 A * | 8/2000 | Kuhne et al. | 188/71.1 |

\* cited by examiner

MODULAR BRAKE MECHANISM

CROSS REFERENCE TO PENDING APPLICATIONS

This application claims priority from pending Swedish Patent Application Numbers 0002058-6 filed on May 31, 2000 and 0002942-1 filed on Aug. 18, 2000.

TECHNICAL FIELD

The present invention concerns a modular brake mechanism for a disc brake.

The brake mechanism is to be received in some kind of a caliper. The brake mechanism according to the present invention is primarily intended for a heavy road vehicle but may quite as well be used for a lighter road vehicle or a rail vehicle.

PRIOR ART

It is previously known to let the brake mechanism be made of one unit, se e.g. WO 96/12 900.

SUMMARY OF THE INVENTION

One object of the present invention is to facilitate the replacement of different parts of the brake mechanism that show different wear. By dividing the brake mechanism in two or more units or modules and by dividing brake mechanism components differently among the modules it is possible to adapt the brake mechanism to the demands of different markets. In some markets, e.g., the bellows may be put under more stress than normal and have to be changed more often. In other markets the adjuster mechanism, synchronisation gears and bearings may have a higher wear than other parts.

Furthermore, assembly of the brake mechanism may be easier for certain calipers if it is possible to assemble the mechanism in two or more units.

The brake mechanism of the present invention is preferably pneumatically actuated, but it may also be hydraulically or electrically actuated.

Further objects and advantages of the invention will be obvious for a person skilled in the art from reading the description below.

BRIEF DESCRIPTION OF THE DRAWINGS

Embodiments of the invention will be more closely described below as a way of example and by reference to the enclosed Figs., in which.

DETAILED DESCRIPTION OF PREFERRED EMBODIMENTS

As used in this description the expression "front side" when used in connection with the caliper stands for the side of the caliper facing the brake disc. The expression "rear side" stands for the opposite side. This also applies for similar expressions.

Figure 1:
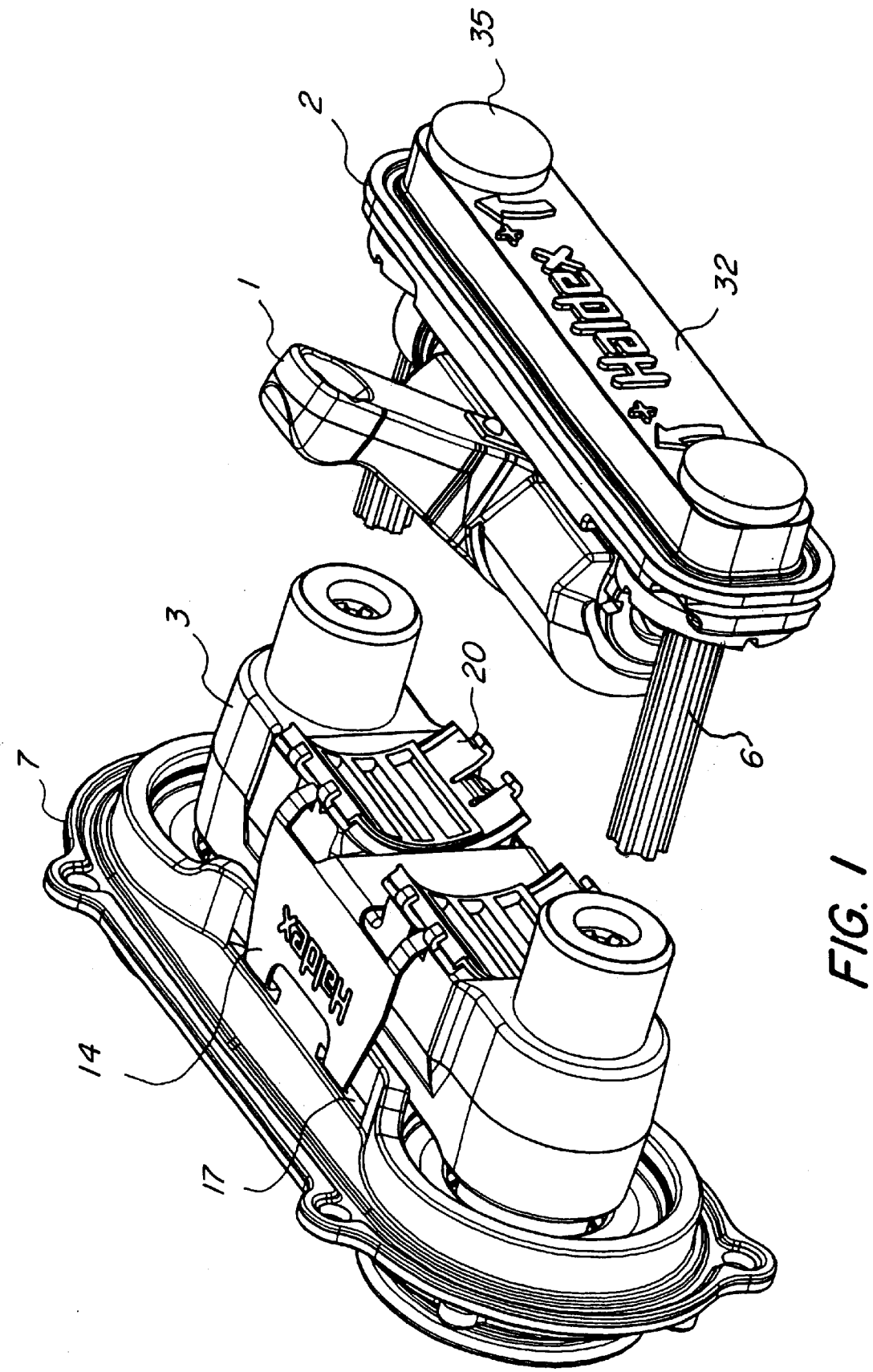
FIG. 1 is a perspective view of a first embodiment of a modular brake mechanism according to the invention.
Figure 2:
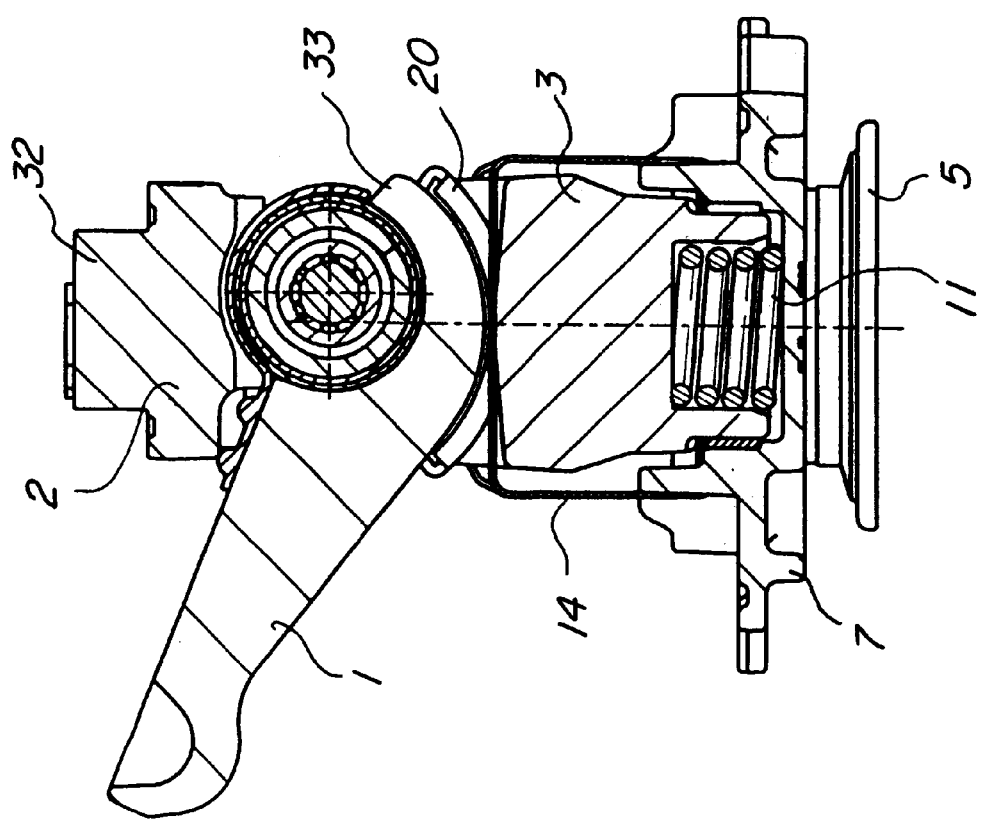
FIG. 2 is a cross section of the brake mechanism of FIG. 1.
Figure 3:
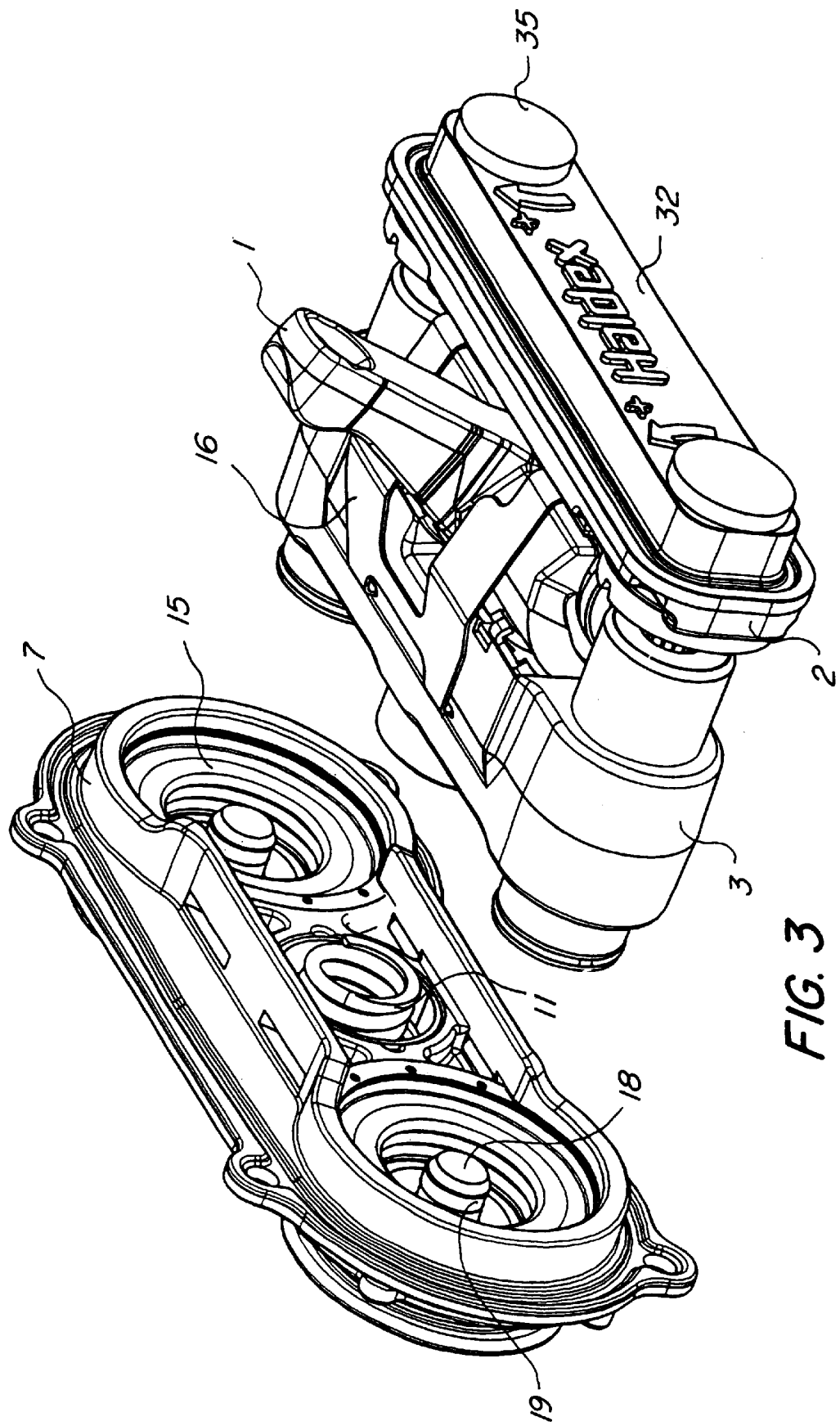
FIG. 3 is a perspective view of a second embodiment of a modular brake mechanism according to the invention.
Figure 4:
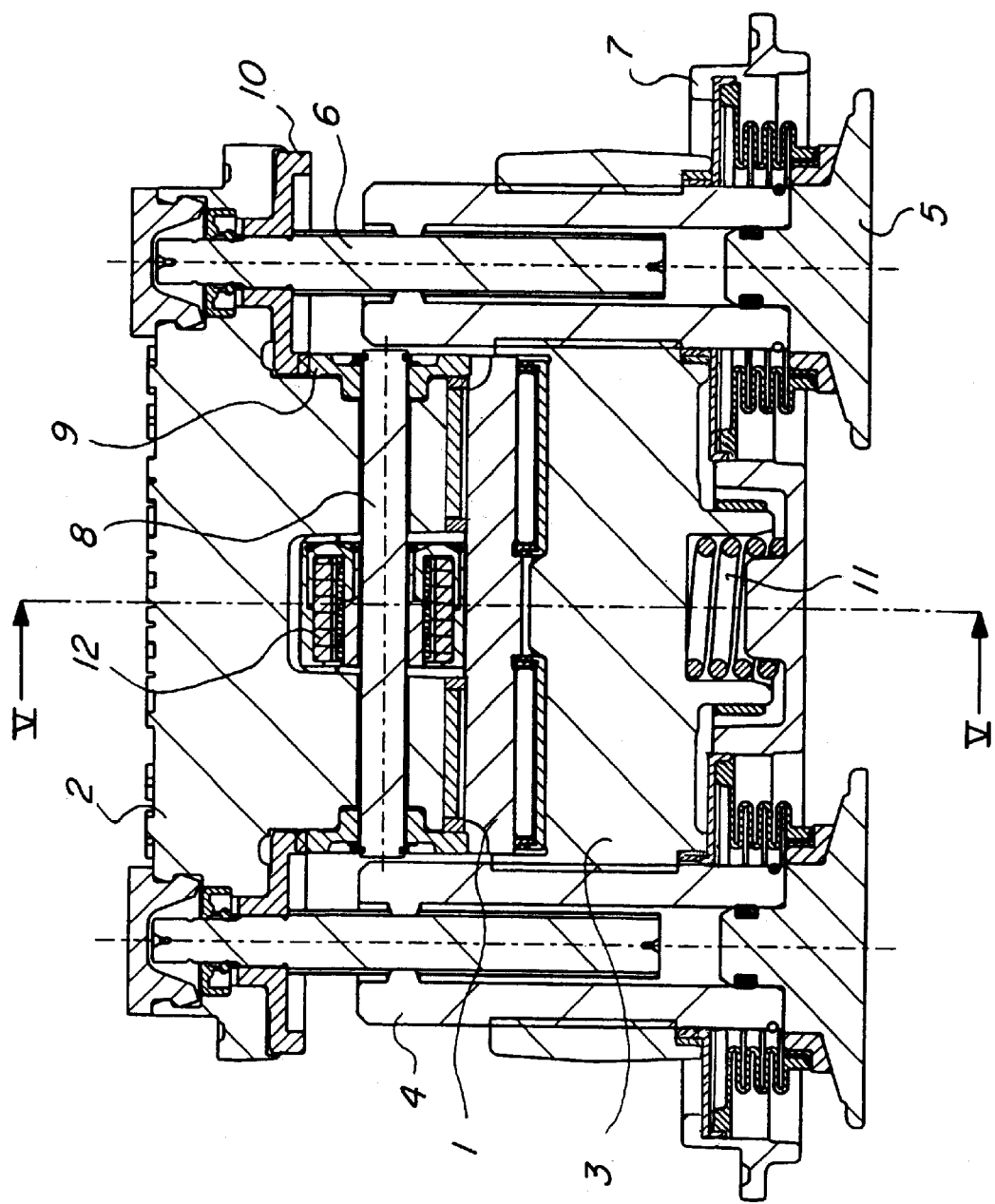
FIG. 4 is a cross section of the brake mechanism of FIG. 3.
Figure 5:
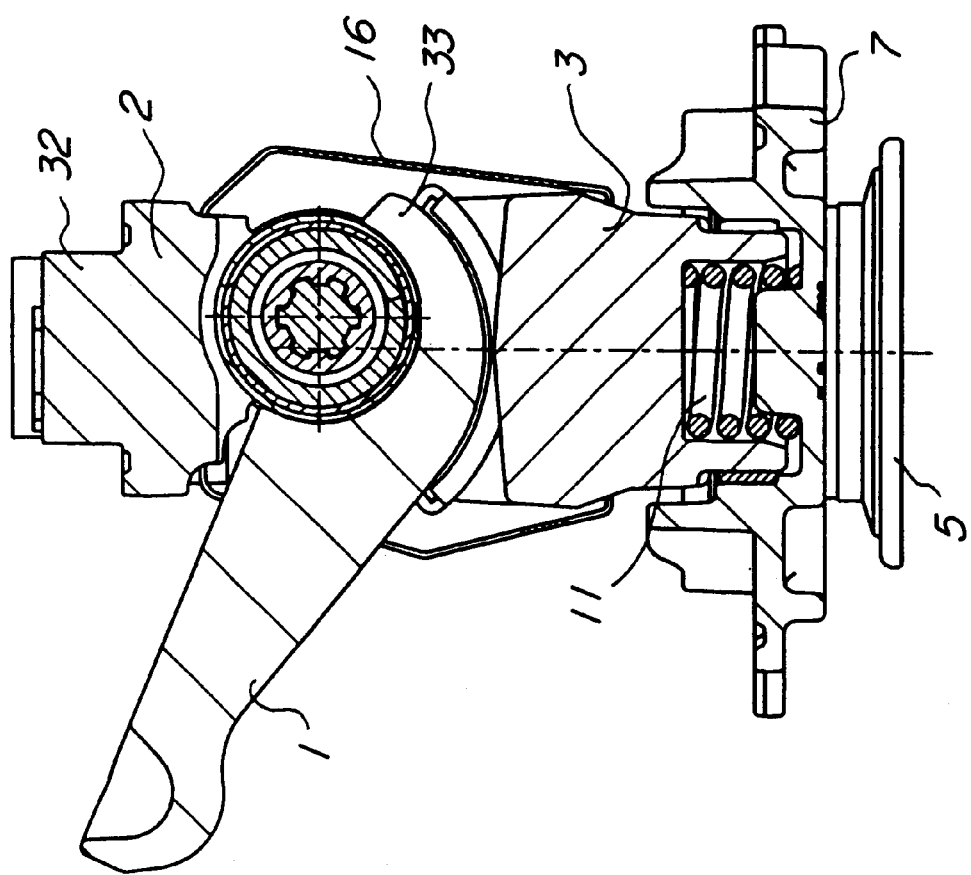
FIG. 5 is a cross section of the brake mechanism of FIGS. 3 and 4 taken along the line V—V in FIG. 4.
Figure 6:
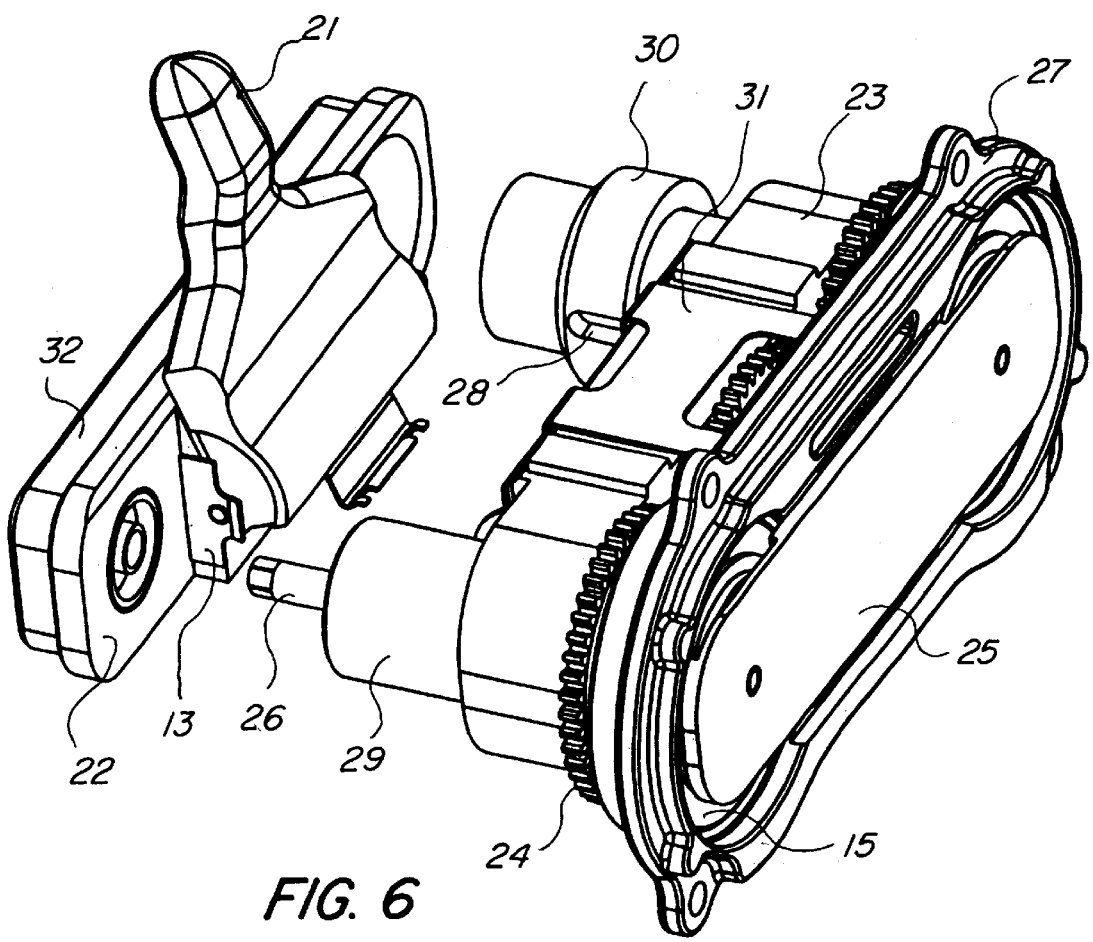
FIG. 6 is a perspective view of a third embodiment of a modular brake mechanism according to the invention.

A first embodiment for a modular brake mechanism according to the present invention is shown in FIGS. 1 and 2. A second embodiment for a modular brake mechanism is shown in FIGS. 3 to 5. A third embodiment for a modular brake mechanism is shown in FIG. 6.

The only difference between the first and second embodiments is which parts belong to which module or unit. Thus, most of the different parts of the brake mechanisms are the same and these parts will normally only be described once in the description below.

In the embodiments of FIGS. 1 to 5 the main components of the brake mechanism of the invention are a lever 1, a bearing bracket 2, a cross bar 3, adjustment screws 4, thrust plates 5, reset and adjustment shafts 6, a closing plate 7, a synchronisation shaft 8, pinions 9, crown wheels 10, a return spring 11, an adjuster mechanism 12 and bellows 15. The lever 1 acts on a cross bar 3. The lever 1 is supported by roller bearings 20 placed in a bearing bracket 2 to be received in a brake caliper (not shown) and the cross bar 3, respectively. In other embodiments (not shown) the lever 1 is received in bearings placed directly in the caliper, i.e. without the use of any bearing bracket. In some embodiments the roller bearings are replaced by plain bearings.

The brake force from the piston rod of the brake cylinder (not shown) is transmitted to the mechanism, especially the cross bar 3, by means of the lever 1. The lever 1 consists in essence of an arm extending out from what could be called a curved wedge 33 having cylindrical surfaces in engagement with corresponding cylindrical surfaces of the cross bar 3 and bearing bracket 2. The inner cylindrical surface of the curved wedge 33 cooperates with the bearing bracket 2, whereas the outer cylindrical surface with larger radius than the inner cylindrical surface co-operates with the cross bar 3. The centres for these two cylindrical surfaces are offset in relation to each other. When the lever 1 moves downwards, as shown in FIG. 2, the curved wedge 33 will be forced in between the bearing bracket 2 and the cross bar 3 and push the latter downwards, accomplishing a brake application. The cross bar 3 will move in a plane essentially perpendicular to the plane of the brake disc.

Figure 7:
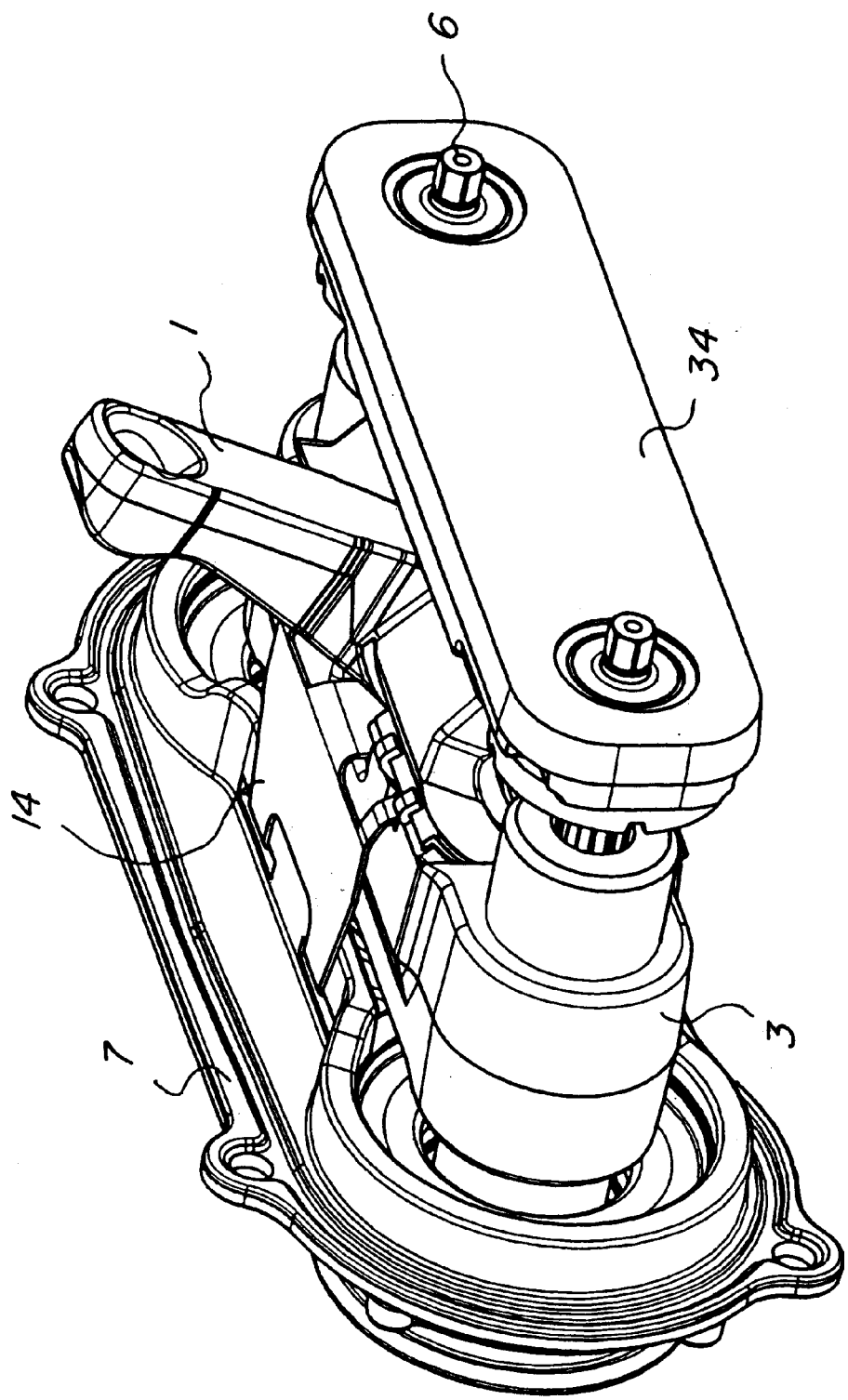
FIG. 7 is a perspective view of a brake mechanism with an alternative form for the bearing bracket.

A portion of the bearing bracket 2 functions as a cover 32 for an opening at the rear of the caliper. In some embodiments the bearing bracket 2 has no cover as it is intend for use in a caliper having no opening in the rear side. (Cf. FIG. 7)

The cross bar 3 has two threaded openings each receiving an adjustment screw 4. Thus, the adjustment screws 4 are rotatably mounted in the cross bar 3. Each adjustment screw 4 is provided with a thrust plate 5, which is to act on a brake pad holder (not shown) or the like. The brake pad will go into contact with the brake disc during activation of the brake. As is known, a further brake pad is arranged on the opposite side of the brake disc. The further brake pad is in a known way brought into contact with the brake disc in that the caliper is moved at the activation of the brake. When the brake mechanism is assembled, two adjustment and reset shafts 6 will be received inside the adjustment screws 4. The adjustment and reset shafts 6 are axially moveable but non-rotatably connected to the adjustment screws 4.

Furthermore, the brake mechanism comprises a closing plate 7 fixed to the caliper at assembly. The closing plate 7 is fixed to the caliper by means of screws. The closing plate 7 is used to close the opening on the front side of the caliper. A return spring 11 is positioned between the closing plate 7 and the cross bar 3 in order to bring the brake mechanism back to its rest position.

The brake mechanism includes a synchronising shaft 8, having pinions 9 at each end. The pinions 9 are coupled to crown wheels 10 non-rotatably connected to the adjustment and reset shafts 6. The synchronising shaft 8 carries an adjuster mechanism 12 of known design. The pinions 9, crown wheels 10, synchronising shaft 8 and the adjuster mechanism 12 form a synchronising unit, synchronising the movements of the adjustment and reset shafts 6.

The adjustment and reset shafts 6 are furnished with suitable heads to receive a tool used to reset the thrust units when the brake pad is to be replaced. A removable cap 35 is normally placed over the head for protection.

To protect the brake mechanism from road dirt bellows 15 are placed between the thrust plates 5 and the closing plate 7. In the shown embodiment the bellows 15 are placed in a heat protection ring.

The closing plate 7 has openings to receive the thrust units. There is a clearance between the closing plate 7 and the thrust units allowing the thrust units to move in any direction in relation to the closing plate 7.

In the embodiment of FIGS. 1 and 2 one module or unit consists of the lever 1, the bearing bracket 2 including the synchronisation unit and the adjustment and reset shafts 6. The lever 1 is held at the bearing bracket 2 by means of clips 13, corresponding to the clips of the third embodiment shown in FIG. 6. The adjustment and reset shafts 6 are received in openings of the bearing bracket 2. In embodiments without any bearing bracket the shafts 6 are received directly in the caliper (not shown).

The cross bar 3, the closing plate 7, the return spring 11, the adjustment screws 4, the bellows 15 and the thrust plates 5 form the second unit of the brake mechanism. The second unit is held together by means of a brace 14. The brace 14 goes around the cross bar 3 and the ends of the brace are received in openings of the closing plate 7.

During assembly of the second module it is important that parallelism is established and kept between the thrust units. If there is no parallelism the brake pads will have an uneven wear, which may jeopardise the function of the disc brake.

At intensive use of the brakes, e.g. in city bus operations, the adjuster mechanism 12, synchronisation gears 9,10 and bearings 20 have a higher wear than other parts in the mechanism. It is therefore an advantage to be able to supply a module comprising these parts, as shown in the embodiment of FIGS. 1 and 2, as a spare part.

In the embodiment of FIGS. 3 to 5 the lever 1, the bearing bracket 2 including the synchronisation unit, the cross bar 3, the adjustment screws 4, and the adjustment and reset shafts 6 form the first module or unit of the brake mechanism. This first unit is held together by a brace 16. The brace 16 is made of two halves and the ends of the brace 16 are received in openings of the cross bar 3 and the bearing bracket, respectively.

The second module or unit includes the closing plate 7, the return spring 11, the bellows 15 and the thrust plates 5. The thrust plates 5 are received and held in the bellows 15. The thrust plates 5 have a pin 18, which is received in the adjustment screws 4. The pin 18 of each thrust plate 5 is pressed into each adjustment screw 4 at assembly and is held in the adjustment screw 4 by means of a force fit, given by an elastic ring 19 on the pin 18. The return spring 11 is held at the closing plate 7 by means of a force fit.

During assembly of the brake mechanisms of FIGS. 1 to 5 the module including the lever 1 is normally first brought into the caliper, then the other module is brought in and the closing plate 7 is fixed to the caliper. After assembly the brake mechanism will be held together within the brake caliper by screws fixing the closing plate 7 to the caliper.

At operation in mountain areas the brakes are exposed to high temperatures and the parts close to the brake pads and the brake disc, especially the seals and bellows 15, get a limited service life. Under such conditions it is an advantage to enable replacement of a module according to the embodiment of FIGS. 3 to 5, containing these parts without having to replace the whole mechanism.

Figure 8:
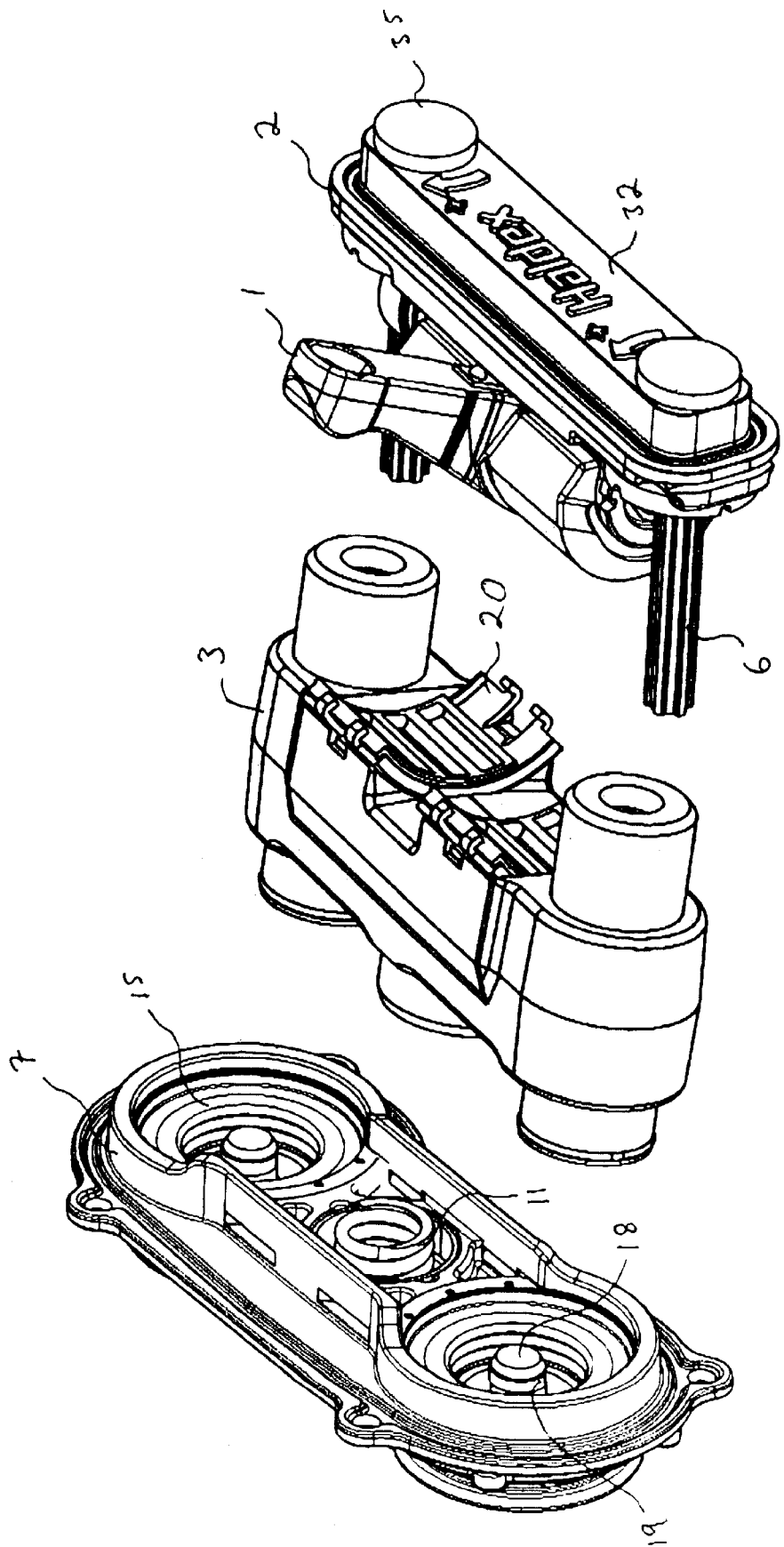
FIG. 8 is a perspective view of another embodiment of a modular brake mechanism with more than two modules.

In further alternative embodiments the different units of the brake mechanism consist of other parts, i.e. the brake mechanism may be divided in different locations, and the brake mechanism may be divided into more than two units. Normally the brake mechanism consists of at least two units. A person skilled in the art realises, e.g., that the brake mechanism may be divided into three modules if the brake mechanism is divided in both positions of the above embodiments (see FIG. 8). Accordingly, in a three module mechanism, one embodiment could involve a first module comprising the lever, bearing bracket, synchronization unit, and adjustment and reset shafts, a second module comprising the cross bar and adjustment screws; and a third module comprising the closing plate, bellows, a return spring and the one or more thrust plates.

The brake mechanism of the embodiment according to FIG. 6 comprises as main components a lever 21, a bearing bracket 22, a cross bar 23, gear wheels 24, bellows, a thrust plate 25, a reset shaft 26, a closing plate 27, adjustment screws 29 and an adjustment mechanism 30. A portion of the bearing bracket 22 functions as a cover 32 for an opening at the rear of the caliper.

In the embodiment of FIG. 6 the first module is formed of the lever 21 attached to the bearing bracket 22 by means of clips 13.

The second unit comprises the rest of the above main components, i.e. the cross bar 23, the gear wheels 24, the bellows, the thrust plate 25, the reset shaft 26, the closing plate 27, the adjustment screws 29 and the adjustment mechanism 30. The cross bar 23 receives two thrust units. Each thrust unit comprises an adjustment screw 29. One of the thrust units is further furnished with an adjuster mechanism 30 and an adjuster shaft. The adjuster mechanism 30 is placed on top of the adjustment screw. The other thrust unit is furnished with a reset shaft 26. The adjustment screws are drivingly connected by means of a set of gear wheels 24. The set of gear wheels 24 are placed between the closing plate 27 and the cross bar 23. The thrust units are connected with a common thrust plate 25, which thrust plate 25 acts on a brake pad (not shown). The reset shaft 26 is furnished with a suitable head to receive a tool used to reset the thrust units when the brake pads are to be replaced. This movement will be transferred to the adjuster shaft by means of the set of gear wheels 24.

The second module is kept together before assembly by a brace 31. The brace 31 surrounds the cross bar 23 and the ends of the brace 31 are received in openings of the closing plate 27 (cf. FIG. 2).

The adjuster mechanism 30 is of a known construction. The adjuster mechanism 30 co-operates with the lever 21 by means of a lever pin received in a groove 28 of the adjuster mechanism 30. When the brake is applied the lever pin will act on the adjuster mechanism 30 via the groove 28. But as this is not part of the present invention it will not be further described here.

During assembly of the brake mechanism the module including the lever 21 is normally first brought into the caliper, then the other module is brought in and the closing plate 27 is fixed to the caliper. After assembly the brake mechanism will be held together within the brake caliper by screws fixing the closing plate 27 to the caliper.

The advantage with the modules according to the embodiment of FIG. 6 is that the parts exposed to wear can be replaced as a module without disturbing the seal between the bearing bracket 22 and the caliper.

The brake mechanism of FIG. 7 is intended for use when the caliper has no opening in the rear side. The bearing bracket 34 of said embodiment has no part corresponding to the cover 32 of the bearing brackets 2,22 of the previous embodiments. In all other respects the embodiment of FIG. 7 is identical with the other embodiments. Thus, the embodiment of FIG. 7 is of a modular form comprising two or more modules or units. Each module comprises at least two components.

What is claimed is:

1. A disc brake system comprising:
    a caliper having an opening at least in a front side thereof;
    a pair of brake pad assemblies;
    a brake mechanism received in the opening of the caliper, the brake mechanism comprises a brake lever, a cross bar operationally connected to the brake lever, one or more thrust plates at the cross bar and a closing plate for closing of the opening in the front side of the caliper, and whereby the cross bar is moveable by means of the lever in a plane essentially perpendicular to the plane of the brake disc;
    wherein the brake mechanism is of a modular form comprising two or more modules, at least one of which modules includes at least two components; and
    wherein each of said modules comprises a self contained unit which is removable from the opening in the caliper.

2. The brake mechanism of claim 1, characterized in that a first module is formed by a bearing bracket together with the lever and adjustment and reset shafts of the brake mechanism; and that the rest of the brake mechanism forms one module held together by a brace.

3. The brake mechanism of claim 2, characterized in that the lever is fixed to the bearing bracket by means of clips.

4. The brake mechanism of claim 1, characterized in that one module is formed of the closing plate, bellows, a return spring and the one or more thrust plates; and that the other parts of the brake mechanism form one module held together by a brace.

5. The brake mechanism of claim 4, characterized in that the lever is fixed to a bearing bracket by means of clips.

6. The brake mechanism of claim 1, characterized in that the brake mechanism comprises three modules.

7. The brake mechanism of claim 6, characterized in that the first module comprises the lever, bearing bracket, synchronization unit, and adjustment and reset shafts; that the second module comprises the cross bar and adjustment screws; and that the third module comprises the closing plate, bellows, a return spring and the one or more thrust plates.

* * * * *